Figure 1:
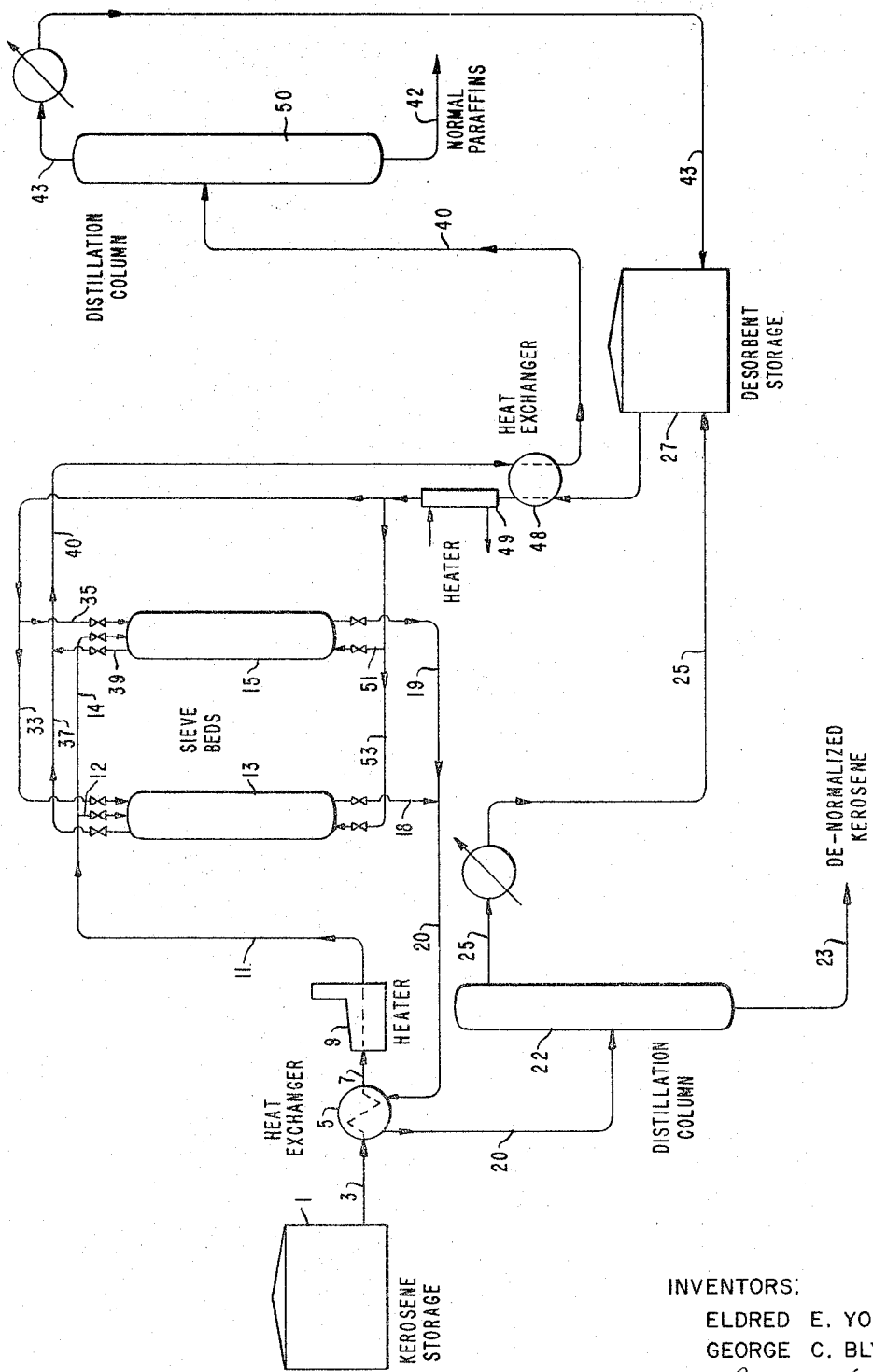

INVENTORS:
ELDRED E. YOUNG
GEORGE C. BLYTAS
BY: Jack L. Foltz
THEIR ATTORNEY

3,309,415
n-PARAFFIN SEPARATION PROCESS

Eldred E. Young, Concord, and George C. Blytas, Albany, Calif., assignors to Shell Oil Company, New York, N.Y., a corporation of Delaware
Filed Jan. 27, 1964, Ser. No. 340,248
7 Claims. (Cl. 260—676)

This invention relates to a process for the recovery of normal paraffins from a mixture thereof with non-normal compounds by selective adsorption with a molecular sieve adsorbent. More particularly, the invention pertains to an adsorption process wherein a relatively high molecular weight adsorbate is removed from the molecular sieves by means of a particular desorbent and under particular conditions of desorption.

Processes for the separation of straight chain hydrocarbons from branched chain and/or cyclic hydrocarbons by contact with crystalline natural or synthetic zeolites having rigid three dimensional anionic networks and having pore dimensions sufficiently large to sorb straight chain hydrocarbons but sufficiently small to exclude the branched chain and/or cyclic hydrocarbons are known, see Barrer U.S. 2,306,610. Such processes, employing zeolites (or as they are more commonly referred to, "molecular sieves") have presented those in the art with the problem of adequately and efficiently effecting desorption to remove and recover the straight chain adsorbate, particularly when the latter is composed of compounds having a relatively high molecular weight. The prior art teaches, among other techniques, the employment of a vaporous material such as flue gas, carbon dioxide, steam, hydrocarbons, etc. as a desorbent and/or suggests the use of a temperature or pressure swing type operation between adsorption and desorption steps, to improve effectiveness of desorption.

In U.S. Patent No. 2,818,455, issued December 31, 1957, to Ballard et al., it is indicated that where a straight chain hydrocarbon is employed as a desorbent, the desorption temperature should be maintained not only above the critical temperature of the adsorbate, but also above the critical temperature of the gaseous straight chain hydrocarbon employed in or as the desorbing medium.

While this may be a satisfactory mode of operation under certain types of separations contemplated by that patent, such as the removal of straight chain hydrocarbons in the molecular weight range of $C_6$ and higher wherein an eluent in the range of $C_3$–$C_5$ is employed or when it is desired to separate relatively low molecular weight straight chain hydrocarbons, such as straight chain hydrocarbons in the molecular weight range $C_3$–$C_7$, wherein the gaseous desorbing medium contains hydrocarbons having more than 7 carbon atoms, it has now been discovered that when higher molecular weight n-paraffins are attempted to be separated by molecular sieves this technique has not proved entirely satisfactory under all conditions of operation.

For example, when a kerosene hydrocarbon feed containing compounds in the $C_{11}$–$C_{15}$ range has been contacted with a bed of molecular sieves and the adsorbate is desorbed by a lower straight chain hydrocarbon, operation at a temperature above the critical temperature of the hydrocarbon adsorbed within the adsorbent requires this employment of temperatures well in excess of 800° F. (e.g., the critical temperature of n-pentadecane is 832° F.). Such high temperatures are a disadvantage because they tend to cause cracking of some components of the feed. A lesser effect is the tendency of such high temperatures to cause damage to the adsorbent, per se, by gradual weakening of its crystal structure and thereby affecting its capacity, particularly if the adsorbent is maintained at these high temperatures for a prolonged period of time. Also, as is well known, as the temperature of adsorption or desorption increases, the saturation capacity or theoretical capacity for adsorbate or desorbent decreases. The likelihood of undesired conversion reactions occurring at elevated desorbing temperature is also increased by the fact that molecular sieves apparently serve to catalyze decomposition and polymerization reactions. The net effect of all of these factors is to make efficient desorption of adsorbed heavy hydrocarbons difficult.

Although the prior art is replete with suggestions as to how these disadvantages may be lessened or alleviated, all of the known solutions appear to have drawbacks. Thus, it is known to use a low molecular weight hydrocarbon either as a diluent to the original feed or as a desorbent per se in order to impart part of its energy by molecular collision to the high molecular weight straight chain adsorbate. Such solutions as these, however, usually also involve the employment of additional separation facilities to permit recovery of the diluent. Further, the amount of material circulating in the system is increased, thus, adding to the cost of the process because the capacity of the sieves is lowered. Also, when certain low molecular weight hydrocarbons are employed as desorbents, the amounts required to effect adequate desorption are excessive.

It has now been discovered, in accordance with this invention, that higher molecular weight hydrocarbons which have been adsorbed by molecular sieves may be expeditiously desorbed therefrom by employing a particular straight chain hydrocarbon desorbent operating above a particularly important temperature whereby improved efficiency of desorption results.

It has also been discovered that, even when operating at adsorption and desorption temperatures above the dew point of the hydrocarbon feed mixture employed, relatively poor adsorption and desorption rates are obtained unless the temperature is maintained at least 40° C. and more preferably at least 50° C. above the dew point temperature of the feed. Although the reasons for the importance of maintaining the temperature above this minimum are not entirely understood, it is believed that it is at least partially attributable to capillary condensation occurring in the sieves and/or chemical fouling which may exist at lower temperatures. In any event, in a vapor phase separation process, even though the adsorption and desorption temperature employed is at a value above the dew point temperature of a heavy hydrocarbon feed mixture, the adsorption and desorption rates as represented by the "breakthrough capacity" of the molecular sieves are adversely affected unless the temperature is above the important lower limit defined above.

In one aspect, the present invention involves a novel, vapor phase adsorptive fractionation process for the recovery of higher molecular weight straight chain hydrocarbons having from 11 to 15 carbon atoms per molecule from a mixture thereof with non-straight chain compounds by means of contacting said mixture with a molecular sieve selective for straight chain compounds whereby the recovery of the adsorbate normals is improved by effecting desorption by the utilization of a normal hydrocarbon desorbent having at least 8 carbon atoms but less than the number of carbon atoms of the lowest boiling n-paraffin in the feed at a temperature which is at least 40° C. and more preferably at least 50° C. above the dew point of hydrocarbon feed.

Surprisingly, the instant process results in a desorbent to adsorbate ratio which is remarkably low. This is extremely important, since the lower the amount of desorbent required, the lower will be the cost of separating it from the product. Thus, a low desorbent to adsorbate ratio is indicative of the ease and efficiency of operation of a particular adsorption separation process.

More particularly, the instant invention pertains to a process for recovery of $C_{11}$–$C_{15}$ n-paraffins from a $C_{11}$–$C_{15}$ kerosene fraction which comprises contacting the kerosene feed maintained in the vapor state with a fixed bed of molecular sieves selective for n-paraffins whereby the normals are adsorbed as adsorbate on the sieves and a reject effluent comprising denormalized kerosene and n-octane desorbent from a previous desorption step is produced. Prior to saturation of the sieves and before the point of breakthrough (i.e., the point at which the first small amount of n-paraffin from the kerosene feed is detected in the reject effluent) the flow of the feed is discontinued, and desorbent comprising n-octane is passed through the bed in reverse flow to the direction of the flow of feed to produce a product effluent comprising the adsorbate normals from the kerosene and some n-octane desorbent. The flow of desorbent is discontinued prior to complete exchange with the adsorbate normals from the kerosene.

Optionally, a purge may be employed following discontinuance of the flow of feed through the adsorbent whereby a relatively small quantity of vapor such as n-octane (although other gases may be employed such as $N_2$) is passed in the same direction as the feed to remove the non-adsorbed kerosene components which are present in the interstitial volume of the bed to produce a purge effluent comprising purge gas plus the residual non-adsorbed portions of the feed.

The product effluent and the reject effluent are separately distilled to recover $C_{11}$–$C_{15}$ normal paraffins as the product of the process; and the n-octane streams from both the product effluent and the reject effluent are recycled for further use as desorbent in the process. When a purge is employed, the purge effluent is usually added to the reject effluent and the combined stream is distilled for normal octane recovery.

An essential feature of the instant process is that the temperature of operation of the adsorption and desorption steps are substantially the same and that the temperature is at least 40° C. above the dew point temperature of the hydrocarbon feed. By the dew point of the feed is meant that temperature of the vaporized feed at which the first appearance of a liquid phase occurs at a given presure.

Another advantageous feature of the instant process is the fact that the employment of a desorbent having at least 8 carbon atoms, rather than other low moleclular weight hydrocarbons such as pentane and hexane, permits the use of a substantially lower amount of desorbent to remove the same amount of adsorbate when the same operation conditions are employed. Of the n-paraffins which are suitable such as n-octane, n-nonane, and n-decane, n-octane is particularly preferred.

Figure 2:
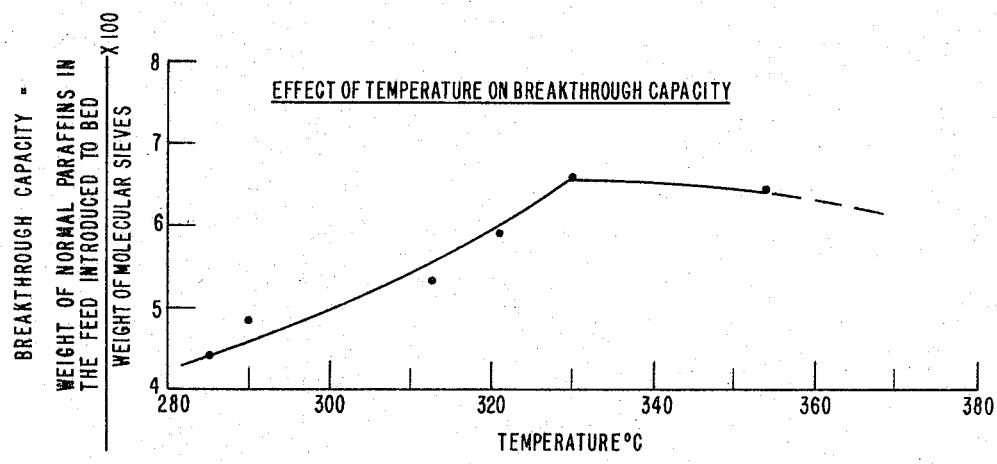
Figure 3:
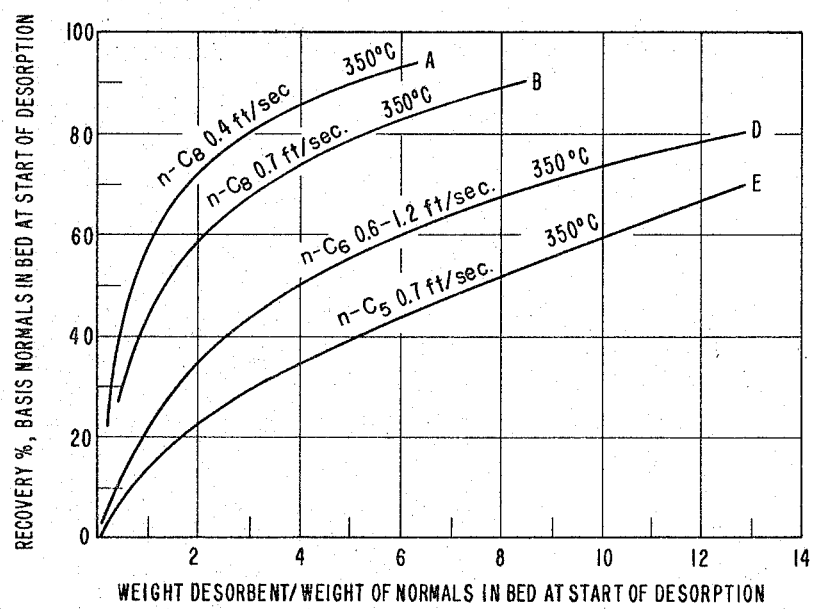

The nature of and advantages of the process are further elucidated by reference to the drawing which comprises three figures. FIGURE 1 schematically presents a process for the recovery of n-$C_{11}$–$C_{15}$ hydrocarbons from a kerosene fraction. FIGURES 2 and 3 represent, respectively, a plot of temperature versus breakthrough capacity and a graph illustrating the advantage of employing n-octane as a desorbent.

Referring to FIGURE 1, the normal paraffin containing kerosene fraction is transported by means of line 3 from storage tank 1 through heat exchanger 5 and heater 9 whereby the feed is vaporized and its temperature raised to that maintained in the adsorber beds 13 and 15. In the adsorber beds, which contain molecular sieves selective to n-paraffins, the feed is contacted with the sieve adsorbent which has substantial amounts of desorbent present therein from a previous desorption step in the process sequence whereby the n-paraffins are adsorbed as adsorbate and a reject effluent containing a mixture of substantially denormalized kerosene and n-octane desorbent is withdrawn through line 20 and, after being used to warm the entering feed in heat exchanger 5, is introduced into distillation column 22. From the distillation zone de-normalized kerosene reject is removed as bottoms while the desorbent is recovered overhead, is condensed and passed via line 25 to the desorbent storage tank so that if desired it may be reused in the process.

The adsorbate n-paraffins which are retained in the sieves during the contact of the feed are recovered therefrom as follows. First the desorbent is transported from storage 27, through heat exchanger 48 and heater 49 where it is heated and vaporized. The vaporous desorbent is then passed through the adsorbent beds in a direction of flow opposite that of the flow of the feed by means of lines 51 and 53 in such a manner that the adsorbate is displaced in the sieves by the desorbent and a product effluent comprising the n-paraffins originally present in the feed mixed with some of the desorbent is withdrawn from the absorber beds. The product effluent is transported by line 40 to a second distillation column 50 where the normal paraffins originally present in the feed are recovered as bottoms and this stream, the product of the process, is recovered through line 42. The desorbent is recovered overhead in line 43, condensed, and recycled to the desorbent storage.

Optionally, a purge step may be employed just prior to the desorption of the n-paraffin adsorbate and immediately after cessation of the passage of feed to the adsorber beds, in which case a relatively smaller quantity of desorbent is passed from the desorbent storage and introduced into the adsorber beds through lines 35 and 33 in the same direction of flow as the feed to purge out any relatively non-adsorbable components of the feed from the interstitial volume of the adsorbent bed to prevent the latter from contaminating the product effluent recovered during desorption.

It will be recognized, of course, that the drawing is merely representative of one preferred schematic flow arrangement and that the auxiliary apparatus employed in this process may be any conventional or convenient type known to those skilled in the art. For simplicity, the drawing does not show all the pumps, tanks, heat exchangers, valves, by-passes, vents, reboilers, condensers, coolers, and other auxiliary equipment that may be necessary for the proper operation of the process but the inclusion of which will be evident to those skilled in the art.

The invention is illustrated, but not limited, by the following specific example of the preparation of an n-paraffin fraction in the $C_{11}$–$C_{15}$ range employing a molecular sieve adsorbent and n-octane desorbent by means of a cyclic process similar to that shown in the drawing.

EXAMPLE

A kerosene feed having a normal paraffin content of about 15% by weight and having a boiling range of 350 to 500° F. stored at a temperature of 100° F. and at atmospheric pressure is passed through a heat exchanger and heater at a flow rate of 8000 pounds per hour whereby the feed is vaporized and heated to a temperature of about 350° C. The vaporized feed is passed at a pressure of about 30 p.s.i.g. to a fixed adsorber bed maintained at a temperature of about 350° C. and a pressure of about 20 p.s.i.g. at outlet which contains molecular sieves of the 5A type in the form of ⅛-inch pellets. The feed is contacted with the adsorbent in the adsorption cycle for about 15 minutes whereafter flow of the feed to the bed is discontinued. Reject effluent is passed at a rate of 8050 pounds per hour to a first distillation column from which 6,800 pounds per hour of denormalized kerosene and 1250 pounds per hour of n-octane are separated. Normal octane at 350° C. and 30 pounds per square inch gauge is passed through the bed in the same direction as the feed as a purge to remove non-adsorbables from the sieve which form a purge effluent and which is combined with the reject effluent so that the n-octane desorbent may be removed by distillation. Next, normal octane at substantially the same temperature and pressure is introduced into the sieve bed in a flow direction opposite to that of the direction in which the feed and purge are passed through the bed to produce a product effluent which is sent to a second distillation column wherein normal $C_{11}$–$C_{15}$ paraffins are recovered as product at a rate of about 1200 pounds per hour. 6000 pounds per hour of n-octane is recovered from the second distillation column and is transported to a storage tank where it is combined with the n-octane obtained from the first distillation column and recycled to the process as purge and desorbent.

Materials suitable as molecular sieves for the purposes of the instant invention include crystalline dehydrated zeolites, natural or synthetic, having a well defined physical structure. Chemically, these zeolites are hydrous alumino-silicates generally containing one or more atoms of sodium, potassium, strontium, calcium or barium cations, although zeolites containing hydrogen, ammonium or other metal cations are also known. These zeolites have a characteristic three-dimensional alumino-silicate anionic network, the cations neutralizing the anionic charge. Any solid selective adsorbent which selectively adsorbs straight chain hydrocarbons to the substantial exclusion of non-straight chain hydrocarbons can be used. Especially applicable are selective adsorbents comprising certain natural or synthetic zeolites or alumino-silicates, such as a calcium alumino-silicate, which exhibits the property of a molecular sieve, that is, matter made up of porous crystals wherein the pores of the crystals are of molecular dimension and are of substantially uniform size.

A well known adsorbent of this type is Linde Type 5A Molecular Sieve which is a calcium alumino silicate which has a pore size of approximately 5 Angstrom units, a pore size sufficiently large to admit straight chain hydrocarbons, such as the normal paraffins and the normal olefins, to the substantial exclusion of the non-straight chain hydrocarbons, i.e., naphthenic, aromatic, isoparaffinic and iso-olefinic hydrocarbons. This particular selective adsorbent is available in various sizes, such as in the form of 1/8 inch or 1/16 inch diameter pellets, or as a finely divided powder having a particular size in the range of 0.5 to 5.0 microns. Materials of this type and methods of making such materials are described in U.S. 2,882,243, and U.S. 3,078,645.

Some of the naturally occurring zeolites which are suitable include chabazite, phacolite, gmellinite, harmotome, phillipsite, clinoptilolite, and erionite in either natural or ion exchanged forms.

The following data illustrates the effect on the breakthrough capacity when operating the adsorption step of the process at different temperatures.

In each of the following test runs (operated so that the pressure on the system was three atmospheres and the superficial velocity through the bed was .25 feet per second) a kerosene fraction sample containing a total n-paraffin content of 20.6% by weight was passed through a fixed (approximately 10 feet long by 1/4 inch diameter) bed containing Type 5A molecular sieves previously saturated with n-octane. The particular feed employed was hydrotreated and had a calculated dew point of about 282° C. at a pressure of 3 atmospheres. The distribution of compounds in percent by weight of total in the kerosense sample was as follows.

| Component: | Percent by weight |
|---|---|
| Heptane | 0.2 |
| Octane | 0.7 |
| Nonane | 0.7 |
| Decane | 7.2 |
| Undecane | 26.4 |
| Dodecane | 34.1 |
| Tridecane | 26.2 |
| Tetradecane | 4.2 |
| Pentadecane | 0.2 |

TABLE I.—EFFECT OF TEMPERATURE ON BREAKTHROUGH CAPACITY

| Run No. | Temperature, °C. | Breakthrough Capacity (Expressed in percent) |
|---|---|---|
| 1 | 285 | 4.45 |
| 2 | 290 | 4.90 |
| 3 | 313 | 5.40 |
| 4 | 321 | 5.90 |
| 5 | 330 | 6.60 |
| 6 | 354 | 6.50 |

As can be seen from Table I and the plot presented in FIGURE 2, the breakthrough capacity, which is defined as the ratio of the total amount by weight of n-paraffins present in the feed introduced to the sieves at the time of initial apperance of normals in the effluent recovered from the sieve to the total weight of the sieves, is much lower at temperatures at or slightly above the dew point temperature of the feed. However, at a point above about 40° C. above the dew point of the feed the breakthrough capacity maximizes and the temperature effect is much less pronounced as the temperature increases.

Another unexpected discovery pertaining to the instant process is the extent to which the use of normal octane as a desorbent rather than other lower boiling compounds such as normal hexane, or normal pentane permits the use of a much lower amount of desorbent to recover the same amount of adsorbate normals from the molecular sieves. This is graphically illustrated in FIGURE 3. In this figure are presented several curves based on data obtained by desorbing 5A molecular sieves having about 6.5 to 7.0% by weight of kerosene normals adsorbed therein with various normals employed as the desorbent. All runs were conducted at the same temperature, 350° C., at the flow rate indicated on each curve. As can be seen, the amount of normal octane require to recover 70% of the adsorbate normals present in the feed is only about 3.5 times the amount of adsorbate normals present in the bed at the beginning of the desorption cycle. On the other hand, for the same recovery when using normal hexane a ratio of about 8.8 weights of desorbent per weight of normals in the bed at the start of desorption is required. In the case of normal pentane the ratio is about 13.7.

We claim as our invention:

1. In a vapor phase process for the recovery of normal $C_{11}$–$C_{15}$ paraffin from a kerosene fraction feed by periodic contact of the feed with a molecular sieve to effect adsorption of the normals followed by desorption of the normals by contact with n-octane, the improvement which comprises effecting said adsorption and desorption at substantially the same temperature and wherein said temperature is at least 40° C. above the dew point temperature of the feed.

2. The process of claim 1 wherein the temperature of adsorption and desorption is maintained above about 330° C. and the pressure is about 3 atmospheres absolute.

3. A process for the recovery of normal $C_{11}$–$C_{15}$ paraffins from a kerosene fraction feed containing said normals which comprises:

(1) contacting said feed at a temperature at least 40° C. above its dew point with a molecular sieve adsorbent capable of selectively adsorbing said normals of said feed whereby a reject effluent comprising the non-normal components of said kerosene, and desorbent normals is obtained;

(2) discontinuing the contact of the adsorbent with said feed and introducing a desorbent comprising n-octane in a flow direction opposite to the flow of said feed at a temperature and pressure substantially the same as that employed in step (1) whereby a product effluent comprising adsorbate normals originally present in said feed and n-octane are obtained;

(3) passing said reject effluent to a first fractional distillation zone whereby the denormalized kerosene is separated from n-octane desorbent;

(4) passing said product effluent to a second fractional distillation zone whereby the normal $C_{11}$–$C_{15}$ hydrocarbons are separated from n-octane and recovered as a product of the process;

(5) combining the n-octane recovered from steps (3) and (4) and recycling for use as desorbent in a later cycle of the process; and (6) repeating the sequence of steps (1) through (5).

4. The process of claim 3 wherein the temperature of adsorption and desorption is maintained above about 330° C. and the pressure at least about 3 atmospheres absolute.

5. A substantially isothermal, isobaric, cyclic, vapor phase process for the recovery of normal $C_{11}$–$C_{15}$ paraffins from a kerosene fraction feed containing said normals wherein each cycle comprises the following steps:

(1) contacting said feed at a temperature lower than the critical temperature of the highest boiling hydrocarbon component of said feed but higher than the critical temperature of n-octane with a molecular sieve adsorbent capable of selectively adsorbing said normals whereby a reject effluent comprising the non-normal components of said kerosene and desorbent n-octane present from the previous cycle is obtained;

(2) discontinuing the contact of the adsorbent with said feed and introducing a purge gas to the sieve in a direction of flow the same as that of the feed whereby a purge effluent is obtained;

(3) passing n-octane desorbent through the bed in a direction opposite to that of the initial flow direction of the feed whereby a product effluent is produced comprising $C_{11}$–$C_{15}$ normals originally present in said feed and n-octane;

(4) passing said reject effluent and said purge effluent and introducing the combined stream to a first fraction distillation zone wherein n-octane and purge gas are separated from the non-normal kerosene fraction;

(5) introducing the product effluent to a second distillation zone wherein n-octane is separated from normal $C_{11}$–$C_{15}$ paraffins, and the latter recovered as the product of the process; and (6) combining the n-octane recovered from steps (4) and (5) and recycling for use as desorbent in a subsequent cycle of the process.

6. The process of claim 5 wherein the purge gas comprises n-octane.

7. The process of claim 5 wherein the purge gas comprises nitrogen.

References Cited by the Examiner
UNITED STATES PATENTS

| | | | |
|---|---|---|---|
| 2,987,471 | 6/1961 | Eggertsen | 208—310 |
| 3,160,581 | 12/1964 | Mattox et al. | 208—310 |
| 3,184,406 | 5/1965 | Yeo et al. | 208—310 |
| 3,184,518 | 5/1965 | Sanders et al. | 260—676 |
| 3,227,647 | 1/1966 | Kvane | 208—310 |

ALPHONSO D. SULLIVAN, *Primary Examiner.*